(12) United States Patent
Carstens et al.

(10) Patent No.: US 9,206,056 B2
(45) Date of Patent: Dec. 8, 2015

(54) TREATMENT OF TANTALUM- AND/OR NIOBIUM-CONTAINING COMPOUNDS

(75) Inventors: Pieter Andries Blatt Carstens, Pretoria (ZA); Jacobus Beyers Wagener, Roodepoort (ZA); Andrew Dirk Pienaar, Centurion (ZA)

(73) Assignee: The South African Nuclear Energy Corporation Limited, Pelindaba, District Brits (ZA)

( * ) Notice: Subject to any disclaimer, the term of this patent is extended or adjusted under 35 U.S.C. 154(b) by 73 days.

(21) Appl. No.: 13/638,713

(22) PCT Filed: Apr. 1, 2011

(86) PCT No.: PCT/IB2011/051408
§ 371 (c)(1),
(2), (4) Date: Nov. 8, 2012

(87) PCT Pub. No.: WO2011/121573
PCT Pub. Date: Oct. 6, 2011

(65) Prior Publication Data
US 2013/0216455 A1    Aug. 22, 2013

(30) Foreign Application Priority Data

Apr. 1, 2010 (ZA) .................................. 10/2361
Apr. 12, 2010 (ZA) .................................. 10/2551

(51) Int. Cl.
| | |
|---|---|
| *C01G 23/02* | (2006.01) |
| *C01G 35/02* | (2006.01) |
| *C01G 33/00* | (2006.01) |
| *C01G 35/00* | (2006.01) |
| *C01G 43/06* | (2006.01) |

(52) U.S. Cl.
CPC ............. *C01G 35/02* (2013.01); *C01G 33/00* (2013.01); *C01G 35/00* (2013.01); *C01G 43/066* (2013.01)

(58) Field of Classification Search
None
See application file for complete search history.

(56) References Cited

U.S. PATENT DOCUMENTS

| | | | | |
|---|---|---|---|---|
| 2,976,114 | A * | 3/1961 | Kern et al. | 423/62 |
| 3,056,649 | A | 10/1962 | Gustison | |
| 3,508,862 | A * | 4/1970 | Conway et al. | 423/62 |
| 3,720,748 | A * | 3/1973 | Massonne | 423/4 |
| 4,275,046 | A | 6/1981 | McVicker et al. | |
| 7,225,561 | B2 * | 6/2007 | Louw et al. | 34/310 |
| 2006/0057043 | A1 * | 3/2006 | Amamoto et al. | 423/19 |

FOREIGN PATENT DOCUMENTS

CN    1059320 A    3/1992

OTHER PUBLICATIONS

N. N. Greenwood, Chemistry of the Elements, 2nd Edition, 1997.*

(Continued)

*Primary Examiner* — Jennifer A Smith
*Assistant Examiner* — Anita Nassiri Motlagh
(74) *Attorney, Agent, or Firm* — McCarter & English, LLP; Jill Mello; Emily Dertz

(57) ABSTRACT

A process for treating a feedstock comprising tantalum- and/or niobium-containing compounds is provided. The process includes contacting the feedstock with a gaseous fluorinating agent, thereby to fluorinate tantalum and/or niobium present in the feedstock compounds. The resultant fluorinated tantalum and/or niobium compounds are recovered.

17 Claims, 5 Drawing Sheets

(56) References Cited

OTHER PUBLICATIONS

Aspart et al., "Study of the chemical behavior of hydrofluoric, nitric and sulfuric acids mixtures applied to niobium polishing", Applied Surface Science 227 (2004) 17-29.*

O.M. El-Husaini and M.N. El-Hazek, "Removal of radioactive elements from niobium and tantalum ores", The European Journal of Mineral Processing and Environmental Protection, vol. 5, No. 1, 1303-0868, 2005, pp. 7-16.*

Dr. G. Raouzeos and Dr. W. Schwenk, "Sublimation: A non-fluid thermal separation process", CPP, Jan. 1995, pp. 40-43.*

Kodama H. et al., "The Thermal Decomposition of $Nb_3O_7Cl$ and $NbO_2F$", Z. anorg. Allg.Chem., 1975, 415: 185-189.

Rakov, E.G. et al., "Fluorination Kinetics of $Nb_2O_5$", Translated from Atomnaya Energiya, vol. 31, No. 2, p. 137, 1971.

International Search Report for PCT/US2011/051408 dated Aug. 4, 2011.

* cited by examiner

TREATMENT OF TANTALUM- AND/OR NIOBIUM-CONTAINING COMPOUNDS

RELATED APPLICATIONS

This application is a 35 U.S.C. §371 national stage filing of International Application No. PCT/IB2011/051408, filed on Apr. 1, 2011 and claims the benefit of South African Patent Application No. 2010/02361, filed on Apr. 1, 2010 and South African Patent Application No. 2010/02551, filed on Apr. 12, 2010. The entire contents of each of the foregoing applications are incorporated herein by reference.

THIS INVENTION relates to the treatment of tantalum- and/or niobium-containing compounds. More particularly, the invention relates to a process for treating a feedstock comprising tantalum- and/or niobium-containing compounds.

Tantalum and niobium are important metals for several modern high technology industries, including industries in the electronics and nuclear fields. The extraction of these metals from their minerals presents unique challenges, as their minerals are not amenable to easy processing and they are difficult to separate from each other because of their very similar chemical properties.

In nature, tantalum and niobium are mainly encountered together as oxides. The most important sources of these elements are the minerals columbite, $(Fe,Mn)Nb_2O_6$, and tantalite, $(Fe,Mn)Ta_2O_6$. Columbite comprises 55-78% $Nb_2O_5$, while tantalite comprises 42-84% $Ta_2O_5$. Another source of these elements is pyrochlore, $(Na,Ca)Nb_2O_6(OH,F)$, which contains mostly niobium, with small amounts of tantalum.

These minerals are conventionally processed by digestion with concentrated (70%) aqueous hydrofluoric acid (HF), or a mixture of HF and concentrated sulphuric acid ($H_2SO_4$). The tantalum and niobium values are extracted, separated and purified by a succession of solvent extraction steps, followed by conversion to oxides or metals, depending on the final product desired. These processes are complicated and hazardous, and produce large quantities of potentially harmful liquid wastes.

Compounding to this is the fact that tantalum minerals, in particular, contain small amounts of radioactive uranium, thorium and their associated daughter products, so that this complicates the transportation of the ore as well as the handling of the waste streams from the extraction process. These radioactive elements are present in the crystal lattice, and are not removed by typical pre-treatment at the mining site. The International Atomic Energy Agency (IAEA) regulations with regard to the levels of radioactivity in materials that can be transported as normal goods limits these levels to a maximum of 10 Bq/g. Tantalum minerals more often have a radioactivity level of 40 Bq/g or higher, and are hence classified as dangerous goods.

In terms of processing, in a raw material dissolution stage, the niobium and tantalum are normally dissolved in a hydrogen fluoride solution. The sludge (or undissolved residue) contains the radioactive thorium and uranium. Dissolving the thorium and uranium in sulphuric acid and extracting it by liquid-liquid extraction or ion exchange resins can remove the radioactivity. However this, once again, has the potential for generating even more hazardous waste.

It is thus an object of this invention to provide a process whereby a feedstock comprising tantalum- and/or niobium-containing compounds can be treated to recover therefrom higher purity tantalum and/or niobium values, whereby these problems are addressed. In particular, it is an object to provide a treatment process which is, as compared to the conventional treatment processes, simpler, will result in the production of lower levels of hazardous wastes, and provides a means for dealing more effectively with radioactive compounds. It is also an object of this invention to provide a means of recovering uranium values present in the feedstock.

Thus, according to the invention, there is provided a process for treating a feedstock comprising tantalum- and/or niobium-containing compounds, which process includes contacting the feedstock with a gaseous fluorinating agent, thereby to fluorinate tantalum and/or niobium present in the feedstock compounds; and recovering the resultant fluorinated tantalum and/or niobium compounds.

The process of the invention thus provides a means for recovering higher purity, or even substantially pure, tantalum- and/or niobium-containing compounds from the minerals.

Typically, both tantalum-containing and niobium-containing compounds may be present. More particularly, the tantalum- and niobium-containing compounds may be minerals such as those hereinbefore described, i.e. columbite $(Fe,Mn)Nb_2O_6$, tantalite $(Fe,Mn)Ta_2O_6$, and, possibly, pyrochlore $(Na,Ca)Nb_2O_6(OH_1F)$ wherein at least some of the tantalum and niobium are present as oxides, particularly $M_2O_5$ where M is Ta or Nb and where uranium may also be present in the same mineral matrix.

The feedstock may thus comprise at least one mineral containing the tantalum- and/or niobium compounds, and, optionally, a uranium compound.

The process may thus include fluorinating a uranium compound present in the feedstock, to obtain a fluorinated uranium compound, and recovering the fluorinated uranium compound. The fluorination of the uranium compound may take place simultaneously with the fluorination of the tantalum- and/or niobium compounds; however, instead, the fluorination of the uranium compound can take place after the recovery of the fluorinated tantalum- and/or niobium compounds has taken place, with a resultant feedstock residue which is thus leaner in tantalum- and/or niobium compounds than the original feedstock then being contacted with a gaseous fluorinating agent to fluorinate the uranium compound.

Thus, the process of the invention also provides a means for recovering uranium values from a feedstock, in addition to tantalum and/or niobium values. The uranium values can be recovered as substantially pure uranium compounds.

The process is characterized thereby that it is carried out in the substantial absence of moisture, i.e. it is a dry process. In other words, few or no harmful and/or hazardous liquid waste products are produced.

The gaseous fluorinating agent may comprise gaseous fluorine ($F_2$) and/or gaseous anhydrous hydrogen fluoride (HF), as a reactive gas, i.e. which, in a fluorinating reaction, fluorinates the tantalum- and niobium-containing compounds. The reactive gas may be pure, i.e. may be in concentrated form. Instead, however, it may be diluted with an inert carrier gas such as nitrogen or argon. The gaseous fluorinating agent may even, if desired, comprise a second reactive gas such as oxygen or water vapour. Other reactive gasses, such as halide fluorides, noble gas fluorides (such as $XeF_2$), $NF_3$, or $OF_2$ may also be used. For the recovery of uranium, a strong oxidative fluorinating agent such as $F_2$, $ClF_3$, $NF_3$ gas may be used as the gaseous fluorinating agent.

The gaseous fluorinating agent, and in particular the reactive gas, thus reacts directly with the tantalum- and niobium-containing compounds to fluorinate the tantalum and niobium.

In one embodiment of the invention, the reactive gas may thus be fluorine gas. The fluorinating reactions may then be in accordance with reaction (1):

$$M_2O_5 + 5F_2(g) \rightarrow 2MF_5 + 5/2 O_2 \quad (1)$$

where M is Ta or Nb.

When the feedstock also comprises or contains uranium, the uranium will typically be present as $U_3O_8$; the fluorinating reaction thereof may then be in accordance with reaction (2):

$$U_3O_8 + 9F_2 \rightarrow 3UF_6 + 4O_2 \quad (2)$$

wherein $UF_6$ is volatile

In another embodiment of the invention, the reactive gas may instead be anhydrous hydrogen fluoride gas. The fluorinating reactions may then be in accordance with reaction (3):

$$M_2O_5 + 10HF(g) \rightarrow 2MF_5 + 5H_2O \quad (3)$$

wherein M is Ta or Nb.

When the feedstock also comprises or contains uranium, the uranium will typically, as hereinbefore indicated, be present as $U_3O_8$; the fluorinating reaction thereof may then be in accordance with reaction (4):

$$U_3O_8 + 8HF \rightarrow UF_4 + 2UO_2F_2 + 4H_2O \quad (4)$$

wherein $UF_4$ and $UO_2F_2$ are non-volatile.

In both embodiments, the degree of fluorination may be controlled by changing reaction parameters such as the reaction temperature, the degree of heat imparted to the reaction, the reaction time and the proportions of reactive gas and/or carrier gas (when present) relative to the tantalum and niobium compounds. Thus, the degree of fluorination may be such that oxyfluorides of tantalum and niobium, rather than fluorides in accordance with reactions (1) and (2), are formed. In other words, in general, compounds of the form $M_xO_yF_z$ in which M is Ta or Nb, x, z are each >0 and y≥0, can be produced. It will be appreciated that when y=0, then pentafluoride compounds as hereinbefore described, i.e. $MF_5$, are obtained. The formation of oxyfluorides can be favoured by including $O_2$ or $H_2O$ as a reactive gas in addition to HF or $F_2$, in the fluorinating agent.

When $O_2$ or $H_2O$ is present as a reactive gas, the $O_2$ or $H_2O$ may be that obtained from reactions (1) and (3) respectively.

For partial fluorination using HF as reactive gas, the reaction for Ta- and Nb-containing compounds may be that in accordance with reaction (5):

$$M_2O_5 + HF(g) \rightarrow M_xO_yF_z + H_2 \quad (5)$$

where M is Ta or Nb.

The feedstock may be a solid ore concentrate in which the tantalum and/or niobium compounds are present in powdered or granular form. It will be appreciated that the solid ore concentrate will normally also contain other elements such as the radioactive elements uranium (U) and thorium (Th) as hereinbefore described, as well as non-radioactive elements such as silicon (Si). Si, when present, will form fluorides, such as $SiF_4$, which are volatile at room temperature, and can therefore easily be removed from the mineral matrix. Any other metals present, such as those found in tantalite ore, for example aluminium, iron, manganese, tin, titanium, tungsten and yttrium, may also be fluorinated, and may then be removed by fractional sublimation, or will remain in the mineral matrix. With HF, U and Th will substantially form non-volatile and typically thermally stable compounds, which hence remain in the solid residue. It is not expected that the proposed process according to this invention will form any uranium oxyfluorides other than the highly non-volatile $UO_2F_2$ when the uranium in the mineral matrix is in the +6 oxidation state. Other oxyfluorides of uranium that may form will thermally decompose to $UO_2F_2$ and $UF_6$. Similarly, the formation of $UF_4$ or $ThF_4$ is highly unlikely, but if so, they are also non-volatile at temperatures below 1,000° C.

The recovery of the fluorinated tantalum and niobium compounds may include volatilization or sublimation. Thus, when Ta and Nb pentafluorides or oxyfluorides are formed, they are volatile when the reaction temperature is sufficiently high, so that they can thus be separated from the mineral matrix and any non-volatile compounds, such as uranium and thorium compounds. They can thereafter be solidified again, or desublimated, by allowing them to cool down. In other words, sublimation can be used to obtain the fluorinated tantalum and niobium compounds in purified form.

More particularly, when anhydrous HF is used as the reactive gas, constituent metal values in the ore concentrate and which are typically in the oxide form, will be fluorinated to their respective fluorides. In particular, the tantalum and niobium values are typically fluorinated to their respective pentafluorides according to reaction (3). The volatilization or sublimation temperatures of tantalum pentafluoride and niobium pentafluoride are 84° C. and 93° C. respectively, and therefore they are very hard to separate. If the reaction temperature is maintained above the sublimation temperatures of the pentafluorides they will sublimate as they are formed and be separated from the mineral matrix. If the reaction temperature is below the sublimation temperature, a moderate subsequent temperature increase will cause the pentafluorides to sublimate. These may thereafter be separated in a multi-step fractional sublimation process by carefully selecting and maintaining the process temperature at a level where the differentiation in sublimation rate is optimised. However, the separation efficiency of this method is low for obvious reasons, and multiple sublimation steps are required for a significant isolation of the metal values.

Alternatively, the reaction conditions such as temperature, reagent (reactive gas) concentration or reagent composition may be selected such that both the Ta and Nb oxides are converted to the oxyfluorides. The oxyfluorides are also volatile, but their volatilisation temperatures range from 160° C. to 850° C. depending on the specific species. Thus, separation and purification of oxyfluorides by fractional sublimation is therefore relatively simple and efficient.

A further alternative approach is to select the reaction conditions such that one of Ta or Nb is preferentially converted to the pentafluoride, while the other is converted to an oxyfluoride. The oxyfluorides are volatile at much higher temperatures than the pentafluorides. Thus, if one of Ta or Nb is in the pentafluoride form and the other in the oxyfluoride form, separation and purification by fractional sublimation will become even more efficient.

Yet another route to follow, after extraction by complete fluorination of the tantalum and niobium as pentafluorides from the mineral matrix according to reaction (1) or (3), is to convert selectively under appropriate conditions either the Ta or the Nb pentafluoride to the oxyfluoride by hydrolysis, leaving the other as the pentafluoride. These can then be separated and purified by sublimation as described before.

Similarly and depending on the reaction and/or separation efficiencies of the relevant steps, a further alternative that may be followed, is to convert by hydrolysis, both the Ta and the Nb pentafluorides after being formed by complete fluorination to the oxyfluoride as before, followed by selective fluorination (e.g. with HF or $F_2$ or any other appropriate fluorinating agent and under appropriate conditions) one of the oxyfluorides back to the pentafluoride, leaving the other as the oxyfluoride. Similarly, these can then easily be separated and purified by fractional sublimation of the two molecular species as before. Although this may seem to add unnecessary intermediate steps, each step contributes to the overall selectivity of the process, which may reduce the number of eventual sublimation steps.

The thus purified pentafluorides or oxyfluorides of Ta and Nb can be converted to the oxides, e.g. by further hydrolysis, or directly to the metals by known appropriate reduction methods, if desired.

Once the tantalum and niobium have been removed from the feedstock, the feedstock residue may contain uranium in the +4 oxidation state as oxides or fluorides and in the +6 oxidation state as oxides or oxyfluorides. The residue may then be treated with $F_2$ gas at elevated temperature to liberate uranium as volatile $UF_6$, according to the reactions:

$$UO_2 + 3F_2 \rightarrow UF_6 + O_2 \quad (6)$$

$$UF_4 + F_2 \rightarrow UF_6 \quad (7)$$

$$U_3O_8 + 9F_2 \rightarrow 3UF_6 + 4O_2 \quad (8)$$

$$2UO_3 + 6F_2 \rightarrow 2UF_6 + 3O_2 \quad (9)$$

$$UO_2F_2 + 2F_2 \rightarrow UF_6 + O_2 \quad (10)$$

The $UF_6$ is volatile already at room temperature and will thus separate from the residue as a gaseous component, after which it can be condensed to give substantially pure $UF_6$.

However, when $F_2$ is used as the reactive gas, the mineral concentrate (in powder or granular form) may be reacted with the fluorine gas, either pure or diluted with an inert gas such as nitrogen or argon. The reaction is preferably carried out at a temperature ranging from room temperature up to 1200° C., more preferably between 200° C. and 600° C. The tantalum and niobium compounds are converted to the respective fluorides ($TaF_5$ and $NbF_5$) according to reaction (1). As hereinbefore described, many of the metal impurities present in the mineral will simultaneously, i.e. in the same processing step or stage, be converted to fluorides as well. At room temperature these will either be volatile (e.g. $SiF_4$) or be non-volatile (many transition metals). In the case of the radioactive elements, Th will form non-volatile $ThF_4$ while U will form volatile $UF_6$. The sublimate will therefore contain stable gases such as $SiF_4$ which are easily removed, as well as $TaF_5$, $NbF_5$ and $UF_6$. The $UF_6$ can be separated from $SiF_4$, $TaF_5$ and $NbF_5$ by fractional distillation. $TaF_5$ and $NbF_5$ can be separated as above by any one of the alternative reaction routes as hereinbefore described in the HF embodiment, followed by the appropriate fractional sublimation step or multiple steps. Once again, fluorides, oxides or metals can be obtained by the said methods as the final product.

The tantalum and niobium pentafluorides or oxyfluorides can be treated further to convert them to desired end products such as high purity metals. Such treatment may include conversion to the oxides or reduction to pure metals.

The invention will now be described in more detail with reference to the accompanying flow diagrams as well as the ensuing non-limiting examples.

In the drawings,

In FIGS. 1 to 6, the same or similar process steps or stages are indicated with the same reference numerals.

Figure 1:
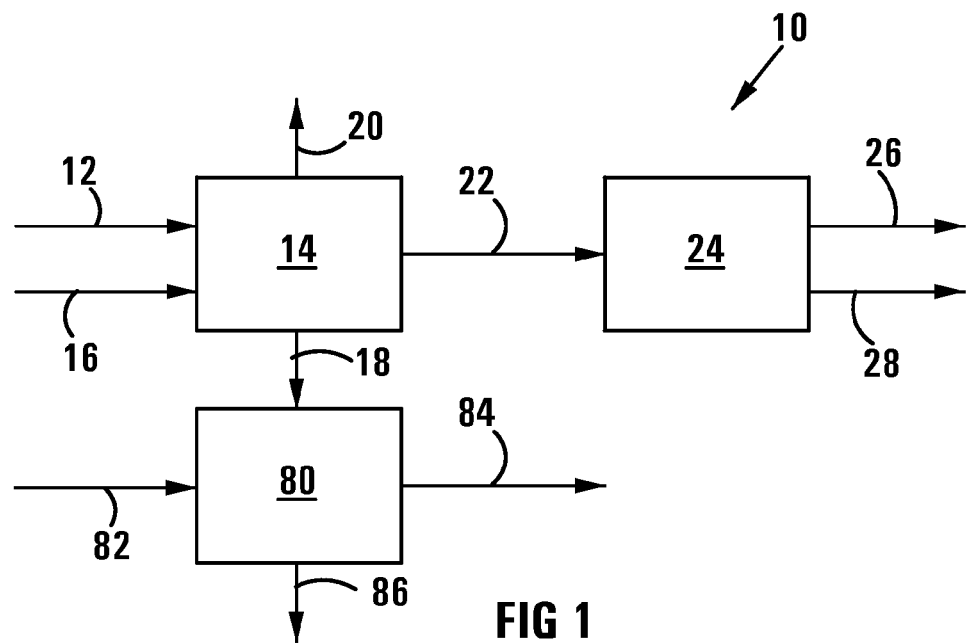
FIGS. 1 to 6 show different embodiments of a process according to the invention for treating tantalum-containing and niobium-containing compounds.

In FIG. 1, reference numeral 10 generally indicates a process, according to a first embodiment of the invention, for treating a feedstock comprising tantalum-containing compounds and niobium-containing compounds, according to the invention.

The process 10 includes an ore concentrate or feedstock feed line 12 leading into a fluorination stage 14. A gaseous fluorinating agent addition line 16 also leads into the stage 14. A solids withdrawal line 18 leads from the stage 14 as does a room temperature volatile fluoride impurities withdrawal line 20.

An elevated temperature volatile products transfer line 22 leads from the stage 14 to a fractional sublimation stage 24 with a tantalum containing product withdrawal line 26 as well as a niobium containing product withdrawal line 28 leading from the stage 24.

In use, a feedstock comprising an ore concentrate containing columbite and tantalite as well as impurities such as uranium and silica, enters the stage 14 along the line 12. Columbite comprises 55-78% $Nb_2O_5$ while tantalite comprises 42-80% $Ta_2O_5$. Anhydrous HF also enters the stage 14 along the line 16.

In the stage 14, the HF is initially reacted with the ore concentrate at room temperature which results in fluorination of the tantalum and niobium values according to reaction (3). It also results in fluorination of uranium values to e.g. $UO_2F_2$ and silicon values to $SiF_4$. $SiF_4$ is volatile at room temperature, and is hence withdrawn along the line 20. The reaction temperature in the stage 14 is then increased to between 95° C. and 100° C. at which temperature $TaF_5$ and $NbF_5$ are volatile and are withdrawn as a gaseous component along the line 22. The residue remaining in the stage 14, including the non-volatile uranium and thorium oxyfluorides, is withdrawn along the line 18.

In the stage 24, the volatile $TaF_5$ and $NbF_5$ withdrawn from the stage 14, are subjected to fractional sublimation to obtain pure $TaF_5$ which is withdrawn along the line 26 and pure $NbF_5$ which is withdrawn along the line 28. It will be appreciated that, instead of having only a single fractional sublimation stage 24, a number of such stages in which iterative fractional sublimation is carried out, may be provided.

The process 10 thus demonstrates complete fluorination of Ta and Nb with HF to pentafluorides, followed by iterative fractional sublimation thereof.

Figure 2:
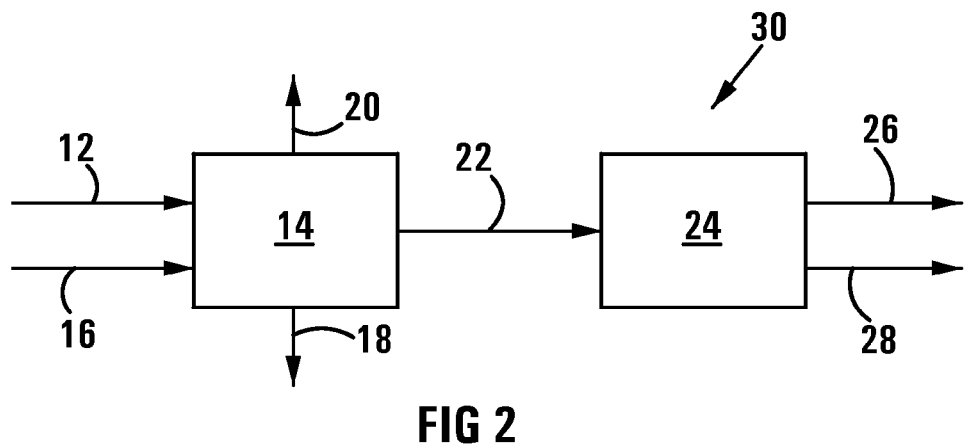

Referring to FIG. 2, reference numeral 30 generally indicates a process, according to a second embodiment of the invention, for treating tantalum-containing compounds and niobium-containing compounds.

The process 30 is similar to the process 10, except that, in the stage 14, only partial fluorination of Ta and Nb with the HF is carried out. Thus, in the stage 14 of the process 30, the formation of oxyfluorides of Ta and Nb in accordance with reaction (5), takes place at a temperature as low as room temperature, but may instead be raised to optimise product selectivity and distribution. The partially fluorinated compounds, i.e. $TaO_xF_y$ and $NbO_xF_y$, are volatile at elevated temperatures substantially higher than the sublimation temperatures of $TaF_5$ and $NbF_5$. Typically, in the process 30, the temperature in stage 14 is increased to between 100° C. and 700° C., depending on which oxyfluoride is targeted. Further, in the stage 30, the make-up of the fluorinating agent fed into the stage 14 along the line 16 comprises a mixture of an inert gas such as Ar or $N_2$ with the reactive gas HF, while low concentrations of $F_2$ may also be utilised. The concentration of the reactive gas HF was selected at 10% in the gas mixture. Optionally, a source of oxygen such as air may also be added. However, the optimal concentrations for each constituent may be found by routine testing.

The process 30 thus demonstrates partial fluorination of Ta and Nb values with HF and an inert make-up gas with an optional source of oxygen to produce oxyfluoride, followed by fractional sublimation thereof.

Figure 3:
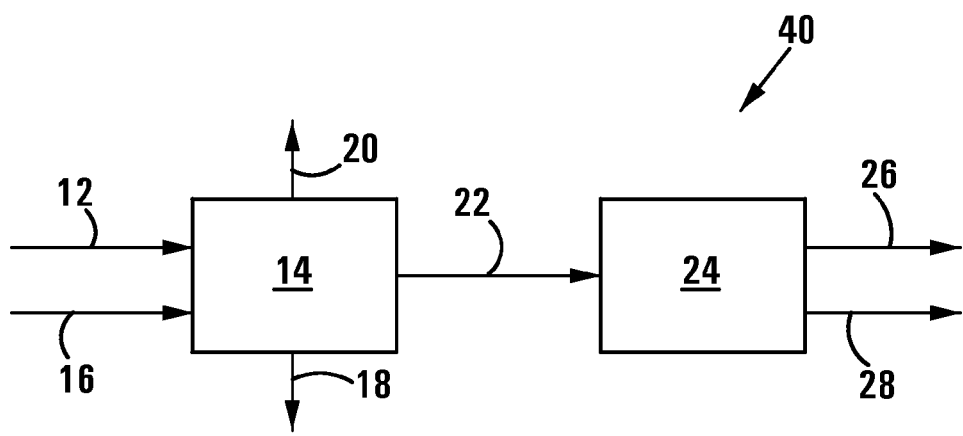

Referring to FIG. 3, reference numeral 40 generally indicates a process, according to a third embodiment of the invention, for treating tantalum-containing compounds and niobium-containing compounds, according to the invention.

In the process 40, the stage 14 is operated such that selective fluorination of the Ta and Nb to tantalum pentafluoride ($TaF_5$) and niobium oxyfluoride ($NbO_xF_y$) are achieved. This is effected by for example carefully selecting and controlling the reaction parameters, such as time, temperature, gas-flow and concentration.

Thus, in the process 40, selective fluorination of Ta and Nb with HF to $NbO_xF_y$ and $TaF_5$ respectively, followed by fractional sublimation, is carried out.

Figure 4:
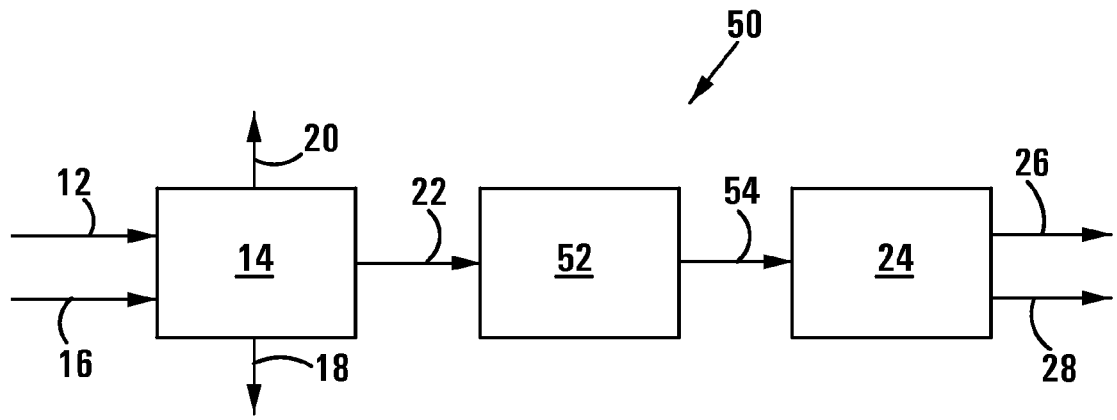

Referring to FIG. 4, reference numeral 50 generally indicates a process, according to a fourth embodiment of the invention, for treating tantalum-containing compounds and niobium-containing compounds.

In the process 50, the transfer line 22 leads into a selective hydrolysis stage 52, with a transfer line 54 leading from the stage 52 to the fractional sublimation stage 24.

The stage 14 of the process 50 is operated in the same fashion as the stage 14 of the process 10. Thus, $TaF_5$ and $NbF_5$ are produced in the stage 14. These compounds pass along the line 22 into the selective hydrolysis stage 52 where the Nb is oxidized to $NbO_xF_y$ while the Ta remains as $TaF_5$. It may also be feasible to find reaction conditions whereby $TaO_xF_y$ is formed and $NbF_5$ remains unreacted.

Thus, in the process 50, fluorination of Ta and Nb with HF to the corresponding pentafluorides, followed by selective hydrolysis of the $NbF_5$ to $NbO_xF_y$, followed by fractional sublimation, is carried out.

Figure 5:
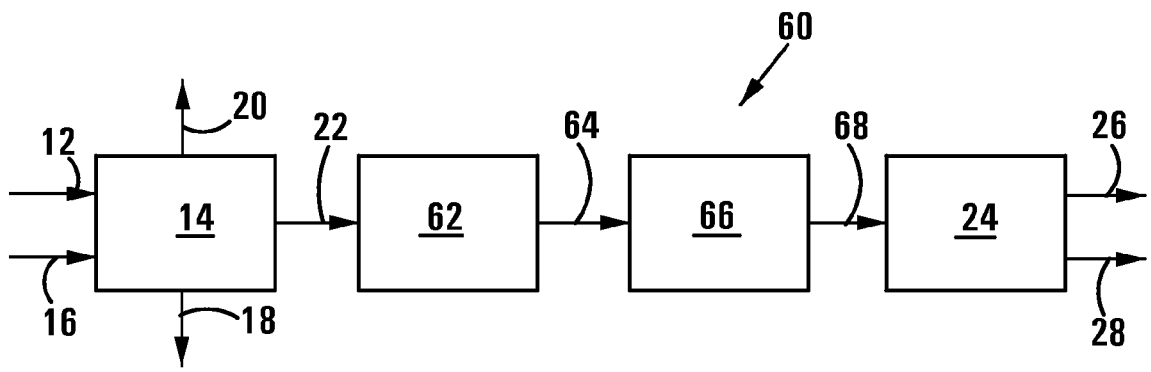

Referring to FIG. 5, reference numeral 60 generally indicates a process, according to a fifth embodiment of the invention, for treating tantalum-containing compounds and niobium-containing compounds.

The process 60 includes a hydrolysis stage 62, with the transfer line 22 leading into the stage 62. A transfer line 64 leads from the stage 62 to a selective fluorination stage 66, with a transfer line 68 leading from the stage 66 to the stage 24.

In the stage 14 of the process 60, the Ta and Nb are fluorinated in accordance with the stage 14 of the process 10, to $TaF_5$ and $NbF_5$ respectively. Thereafter, in the hydrolysis stage 62, they are hydrolyzed to $TaO_xF_y$ and $NbO_xF_y$ respectively. Thereafter, in the selective fluorination stage 66, the $TaO_xF_y$ is preferentially fluorinated to $TaF_6$. Hydrolysis of both tantalum and niobium pentafluorides in stage 62 may occur from room temperature to elevated temperatures to optimise a faster or more selective reaction.

Thus, in the process 60, fluorination of Ta and Nb with HF to their corresponding pentafluorides is followed by hydrolysis of both $TaF_5$ and $NbF_5$ to $TaO_xF_y$ and $NbO_xF_y$ respectively, with x and y not necessarily equal for the respective tantalum and niobium intermediates, followed by selective fluorination so that either the $NbO_xF_y$ is substantially converted to $NbF_5$, or the $TaO_xF_y$ is substantially fluorinated to $TaF_6$ with the other component substantially remaining in the oxyfluoride state and then followed by fractional sublimation as hereinbefore described.

When the feedstock includes uranium values, the processes 10, 30, 40, 50 and 60 of FIGS. 1, 2, 3, 4 and 5 respectively, may include a second fluorination stage 80 (shown in FIG. 1 only but which can thus, if desired, be present in the processes of FIG. 2, 3, 4 or 5 as well), with the solids withdrawal line 18 from the stage 14 then leading into the stage 80. A fluorinating gas addition line 82 leads into the stage 80. A $UF_6$ withdrawal line 84 leads from the stage 80, as does a solids withdrawal line 86.

In the stage 80, feedstock residue from the stage 14 and which is thus lean in tantalum and niobium values, is treated with $F_2$ gas entering along the line 82. This treatment is at elevated temperature, and uranium values present in the residue are fluorinated to form volatile $UF_6$, which is withdrawn along the line 84. The remainder of the solid impurities still present are withdrawn along the line 86.

Figure 6:
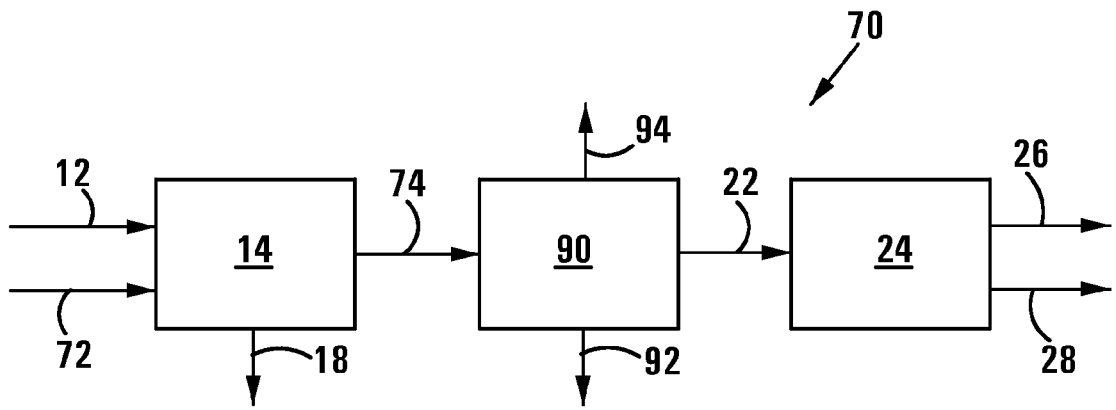

Referring to FIG. 6, reference numeral 70 generally indicates a process, according to a sixth embodiment of the invention, for treating tantalum-containing compounds and niobium-containing compounds.

The process 70 is similar to the process 10, except that a $F_2$ addition line 72 leads into the stage 14 rather than the HF addition line 16. The stages 14, 24 of the process 70 operate in substantially the same fashion as the stages 14, 24 of the process 10.

Since $F_2$ is used in the stage 14 rather than HF, volatile impurities, such as $UF_6$, can form in the stage 14 in addition to volatile $SiF_4$. These volatile impurities exit the stage 14 together with the volatile Ta and Nb fluorides along a line 74, and are then further separated in a stage 90, e.g. using fractional distillation, with $UF_6$ being withdrawn from the stage 90 along a line 92, while other volatile impurities are withdrawn along a line 94. The Ta and Nb fluorides are withdrawn from the stage 90 along the line 22, which leads to the stage 24, as in FIG. 1.

It will be appreciated that, if desired, the process 70 can also be adapted to render it similar to the processes 30, 40, 50 and 60 hereinbefore described, except that $F_2$ is fed into the stage 14 rather than HF.

The processes 30-70 as hereinbefore described may be carried out in batch mode. Alternatively, a continuous process is envisaged utilizing, for instance, a rotary oven operated at a temperature gradient or temperature regions or zones to accommodate the different temperature changes as described as well as withdrawing the various volatile and/or solid intermediates and products at predetermined points or zones.

In the Examples hereunder, a number of the more important steps in the processes of this invention as hereinbefore described, were simulated with substantially pure Ta and Nb pentafluorides and oxides.

EXAMPLE 1

Figure 7:
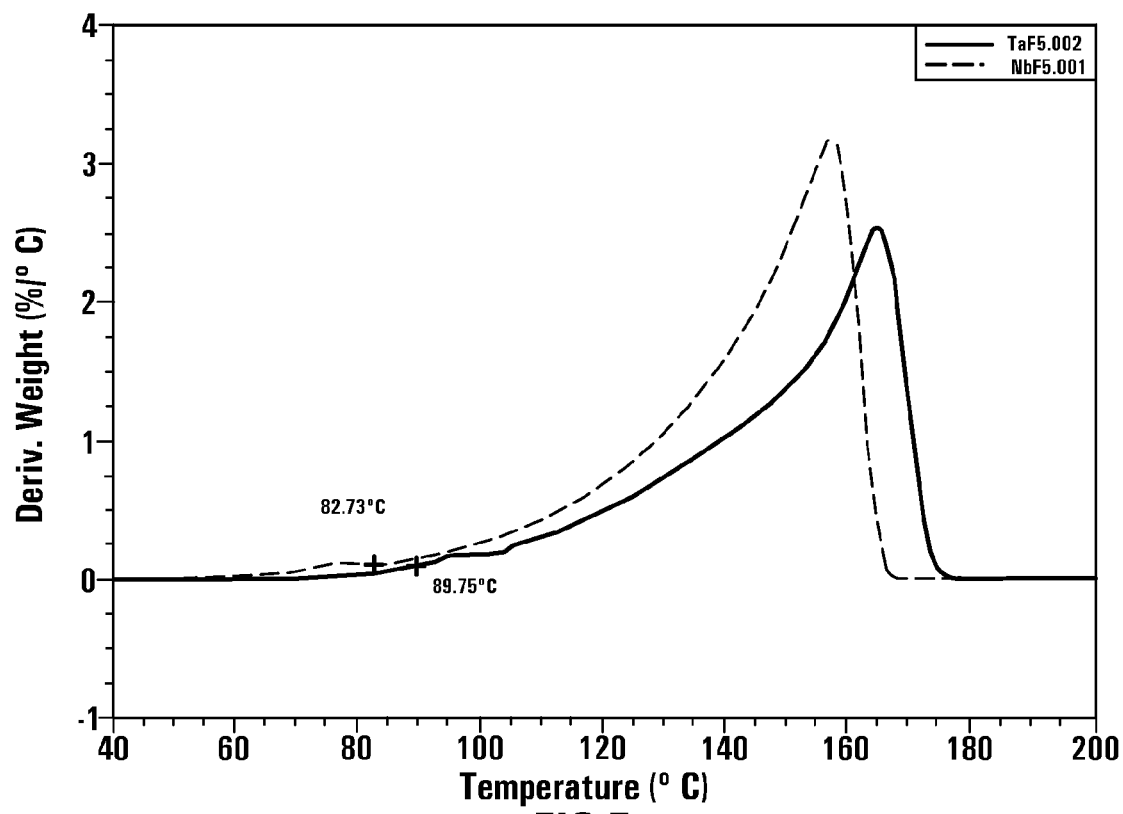
FIG. 7 shows, for Example 1, the first derivative of a TG curve (DTG curve) obtained when heating $TaF_5$ as well as $NbF_5$.

When both tantalum and niobium oxides are fluorinated to their pentafluoride forms, their respective sublimation temperatures are typically 84° C. and 93° C. FIG. 7 shows the first derivative of a TG curve (normally referred to as a DTG curve) obtained when heating $TaF_5$ as well as $NbF_5$. As seen from FIG. 7, sublimation of niobium pentafluoride occurs first followed by sublimation of tantalum pentafluoride.

EXAMPLE 2

In a simulation of the embodiment of the invention as described by process 30 in FIG. 2, niobium and tantalum oxides are separately treated with HF to form oxyfluorides. In this Example, both oxides were treated with a 1:10 $HF:N_2$ mixture at 40° C. Spectroscopy confirmed the presence of oxyfluoride compounds. When these products are then heated, the fractional sublimation property is best shown by overlaying their DTG curves—see FIG. 8.

Figure 8:
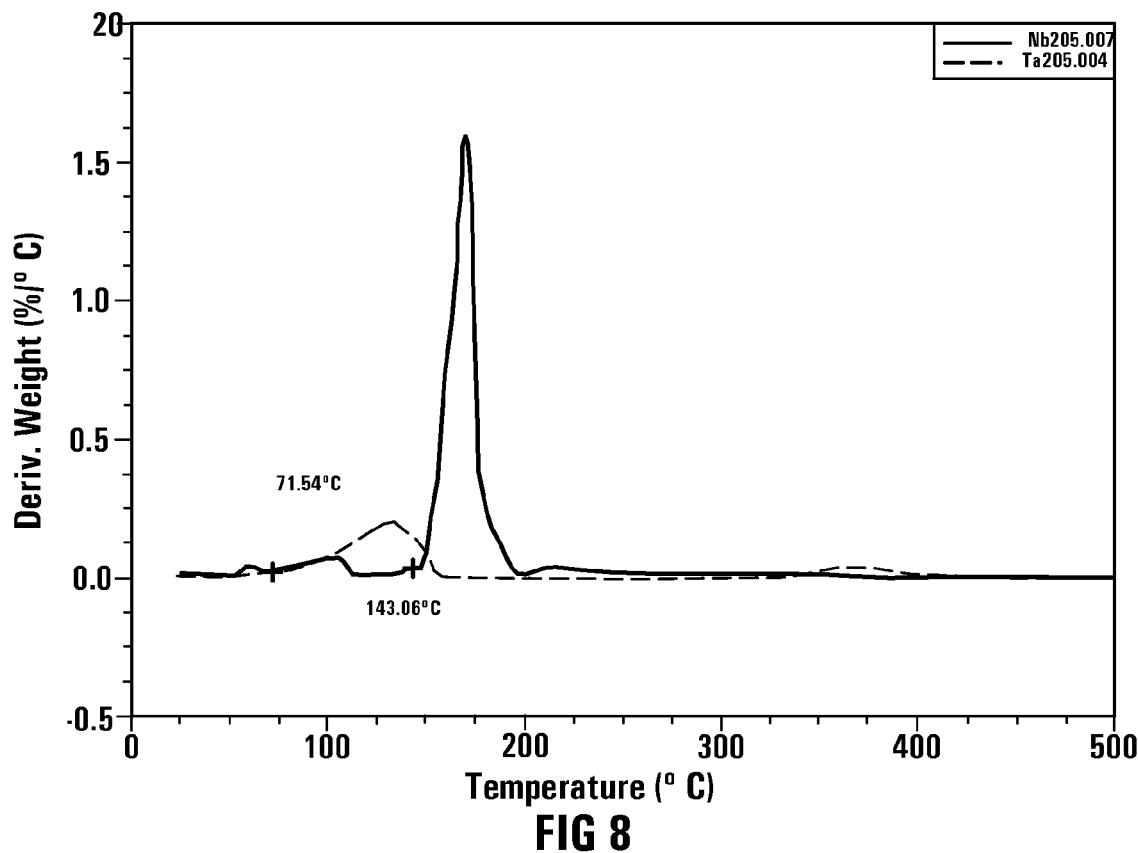
FIG. 8 shows, for Example 2, DTG curves obtained when heating the reaction products of $Ta_2O_5$ and $Nb_2O_5$ with HF as described in Example 2.

In FIG. 8 it is shown that no significant (volatilization) mass loss occurs for the niobium compound below 144° C., while a significant part of the tantalum product (at least 30%) sublimates. By re-treatment of the solid residue, this process may be iteratively continued, systematically removing niobium species.

EXAMPLE 3

Figure 9:
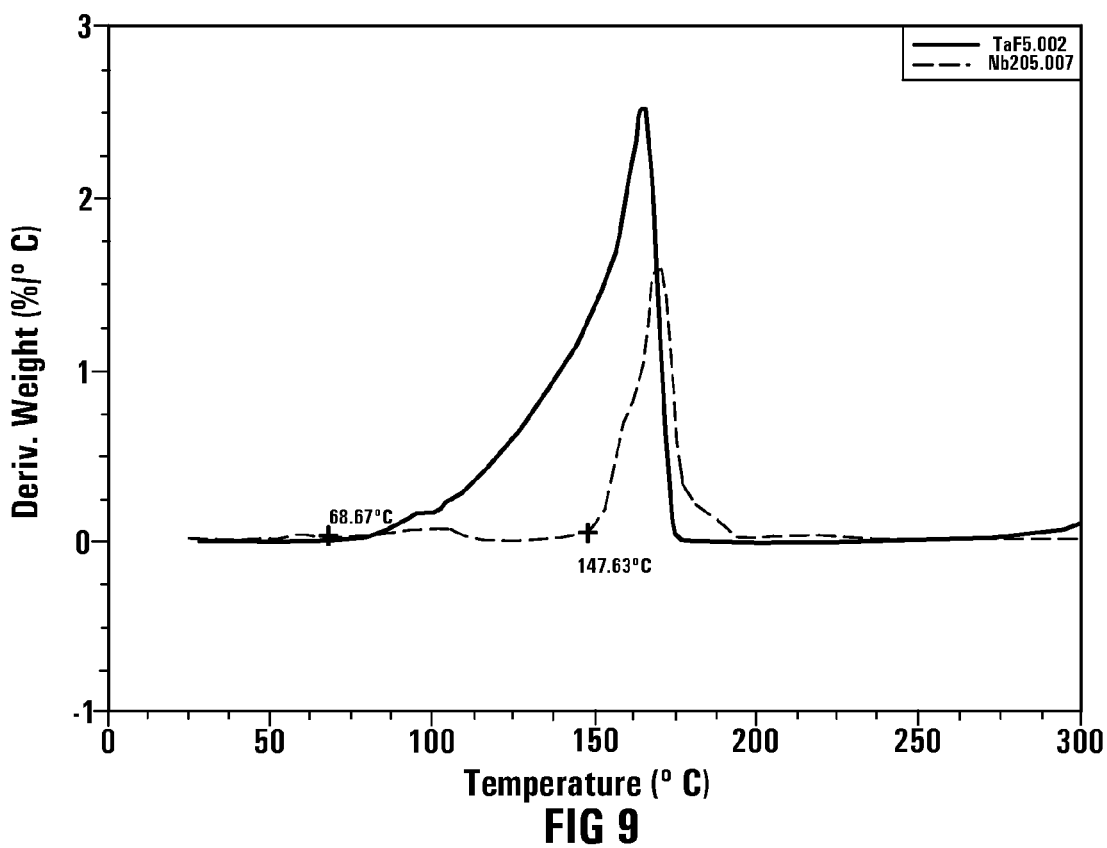
FIG. 9 shows, for Example 3, the DTG curves of $TaF_5$ and $NbO_xF_y$.

FIG. 9 shows the DTG curves of $TaF_5$ and $NbO_xF_y$, which are the products expected in the embodiment described by the process 40 in FIG. 3.

There is about 70° C. difference in volatilization temperatures, which would make separation of these compounds simple.

EXAMPLE 4

Figure 10:
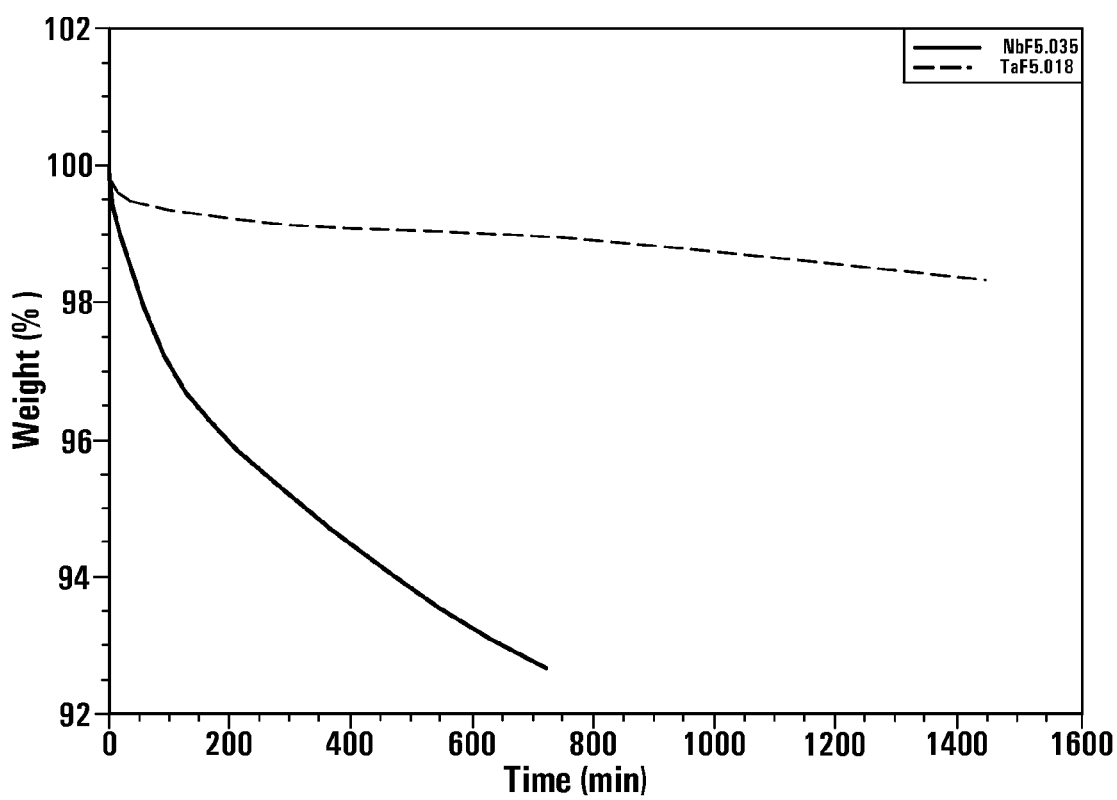
FIG. 10 shows, for Example 4, a graphical representation of hydrolysis of $TaF_5$ and $NbF_5$.

Hydrolysis of tantalum pentafluoride occurs at a much slower rate (at a studied temperature of 40° C.) than niobium pentafluoride (FIG. 10), which supports the possibility of selectively hydrolyzing the niobium fluoride to the oxyfloride.

EXAMPLE 5

Figure 11:
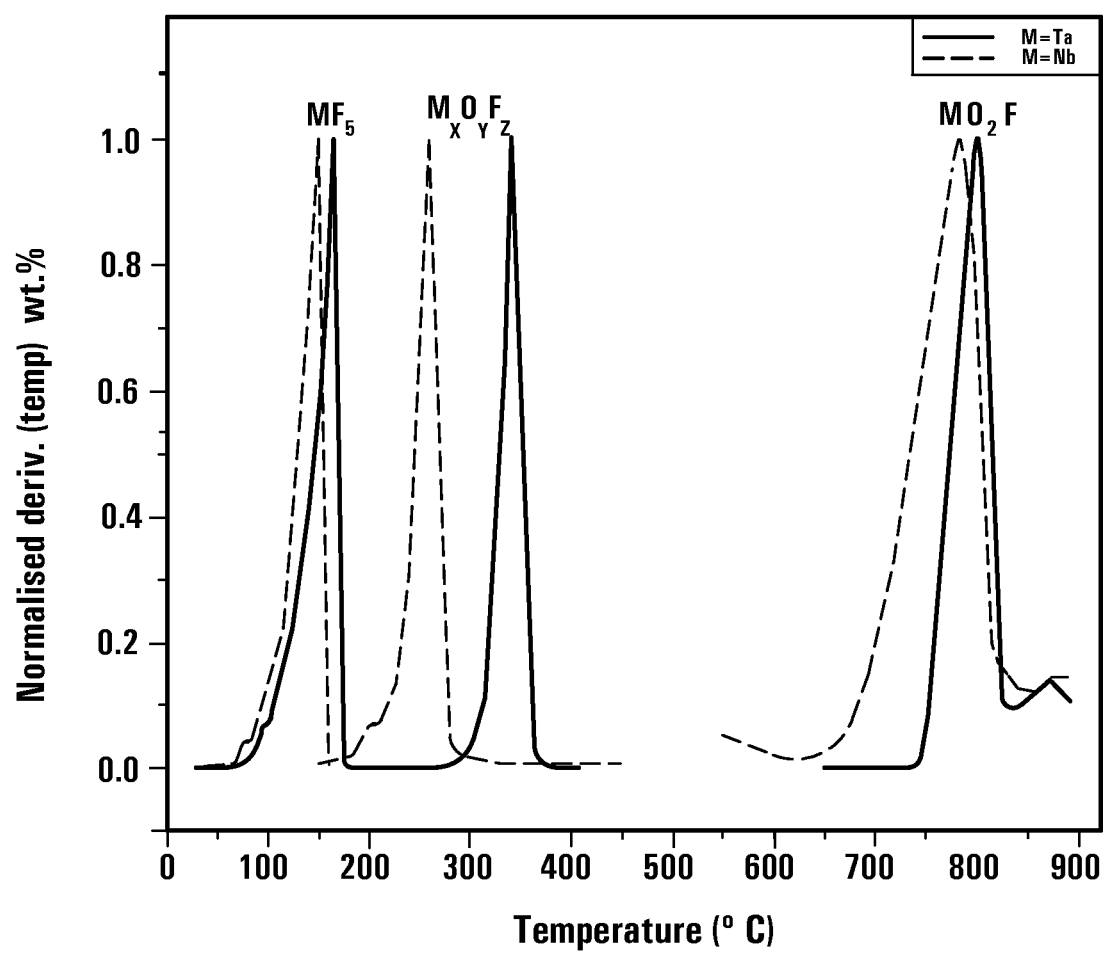
FIG. 11 shows, for Example 5, volatilization/decomposition temperatures of different $M_xO_yF_z$ species, with broken lines indicating fluorinated niobium compounds, and solid lines indicating fluorinated tantalum compounds.

A mixture of $Ta_2O_5$ and $Nb_2O_5$ was prepared at a mass ratio of about 1:1. This mixture was partially fluorinated with gaseous HF at 40° C. according to reaction (5) for a period of 3 hours. From the fluorinated product four samples were taken (see Table 1) and were heated to a temperature of about 165° C., which is the onset temperature for sublimation of a niobium oxyfluoride species (FIG. 11), but well below the onset temperature for the analogous tantalum species under constant nitrogen flow. Ta:Nb ratio measurements with Inductively Coupled Plasma (ICP) analysis before and after each run are shown in Table 1.

Though a maximum separation efficiency of 36.0% was achieved for Run 4, it will be appreciated that with optimising the process parameters and/or cascading several separation steps, a much greater level of separation may be achieved.

TABLE 1

Ta:Nb ratios for treated and untreated samples using ICP values

|  | Ta:Nb ratio Untreated | Ta:Nb ratio Treated | Separation Efficiency |
|---|---|---|---|
| Run 1 | 1.02 | 0.78 | 23.5% |
| Run 2 | 1.02 | 0.68 | 33.3% |
| Run 3 | 1.08 | 0.77 | 28.9% |
| Run 4 | 1.25 | 0.80 | 36.0% |

The invention claimed is:

1. A process for treating a feedstock comprising tantalum-oxide and niobium-oxide, which process includes
contacting the feedstock with a gaseous fluorinating agent, with the gaseous fluorinating agent reacting directly, in a fluorinating reaction, with the tantalum-oxide and niobium-oxide thereby to fluorinate the tantalum and niobium present in the oxides; wherein
either one of tantalum and niobium is preferentially converted to a pentafluoride compound, while the other is converted to an oxyfluoride compound, or both tantalum and niobium are converted to oxyfluoride compounds; and
recovering the resultant fluorinated tantalum and niobium compounds by means of fraction sublimation.

2. A process according to claim 1, wherein the feedstock comprises at least one mineral or a solid ore concentrate containing the tantalum-oxide and niobium-oxide.

3. A process according to claim 2, which is characterized thereby that it is carried out in the substantial absence of moisture, so that it is a dry process, with few harmful and/or hazardous liquid waste products being produced.

4. A process according to claim 2, wherein the gaseous fluorinating agent comprises gaseous fluorine and/or gaseous anhydrous hydrogen fluoride as a reactive gas.

5. A process according to claim 4, wherein the tantalum-oxide and niobium-oxide have the formula $M_2O_5$ where M is Ta or Nb.

6. A process according to claim 5, wherein the reactive gas is fluorine gas, with the fluorinating reaction, to produce the pentafluoride compound, proceeding in accordance with reaction (1):

$$M_2O_5 + 5F_2(g) \rightarrow 2MF_5 + 5/2O_2 \quad (1)$$

where M is Ta or Nb.

7. A process according to claim 5, wherein the reactive gas is anhydrous hydrogen fluoride gas, with the fluorinating reaction, to produce the pentafluoride compound, proceeding in accordance with reaction (3):

$$M_2O_5 + 10HF(g) \rightarrow 2MF_5 + 5H_2O \quad (3)$$

where M is Ta or Nb.

8. A process according to claim 4, wherein the degree of fluorination is controlled such that the oxyfluoride compound of tantalum or niobium that is produced, is in accordance with formula $M_xO_yF_z$ in which M is Ta or Nb, x and z are each >0, and y>0.

9. A process according to claim 8, wherein the fluorinating agent includes, in addition to the reactive gas comprising gaseous fluorine ($F_2$) and/or gaseous anhydrous hydrogen fluoride and which is hence a first reactive gas, also a second reactive gas comprising oxygen and/or water vapour, thereby to promote formation of the oxyfluoride compound.

10. A process according to claim 4, wherein the reactive gas is gaseous anhydrous hydrogen fluoride, with partial fluorination being achieved to produce the oxyfluoride compound(s) in accordance with reaction (5):

$$M_2O_5 + HF(g) \rightarrow M_xO_yF_z + H_2 \quad (5)$$

where M is Ta or Nb, x and z are each >0, and y>0.

11. A process according to claim 2, wherein the feedstock is the solid ore concentrate in which the tantalum oxide and niobium oxide are present in powder or granular form, with the concentrate also containing radioactive uranium and thorium as well as non-radioactive silicon, with the silicon reacting with the fluorinating agent to form a silicon fluoride, while the uranium and thorium react with the fluorinating agent to form non-volatile and thermally stable fluorides and/or oxyfluorides.

12. A process according to claim 2, wherein the fractional sublimation of the fluorinated tantalum and niobium compounds includes, after the compounds have been volatilized at elevated temperature so that they are thereby separated from non-volatile feedstock residue, thereafter desublimating the volatilized compounds, by allowing them to cool down.

13. A process according to claim 2, wherein the feedstock contains, in addition to the tantalum oxide and niobium oxide, also a uranium compound.

14. A process according to claim 13, wherein the reactive gas is fluorine gas which reacts, at elevated temperature and at the same time that it reacts with the tantalum oxide and niobium oxide to fluorinate them, with the uranium compound to form volatile uranium hexafluoride ($UF_6$), with the gaseous uranium hexafluoride then being removed together with the gaseous fluorinated tantalum and niobium compounds that are formed.

15. A process according to claim 14, wherein the gaseous uranium hexafluoride that is formed is separated from the gaseous fluorinated tantalum and niobium compounds.

16. A process according to claim 13 wherein, after recovery of the fluorinated tantalum oxide and niobium oxide has taken place, a resultant feedstock residue which is thus leaner in tantalum and niobium compounds than the feedstock is then contacted at elevated temperature with a gaseous fluorinating agent selected from $F_2$, $ClF_3$ and $NF_3$, to fluorinate the uranium compound.

17. A process according to claim 16, wherein the uranium compound is $U_3O_8$, which is fluorinated to volatile $UF_6$, with the process including separating the volatile $UF_6$ from the resultant residue.

* * * * *